July 15, 1969　　　C. L. McCALEB　　　3,455,296
VIBRATOR ATTACHMENT FOR VEHICLE SEATS
Filed May 18, 1966　　　　　　　　　　　　2 Sheets-Sheet 1

INVENTOR
Clyose L. McCaleb

BY

ATTORNEY

July 15, 1969   C. L. McCALEB   3,455,296
VIBRATOR ATTACHMENT FOR VEHICLE SEATS
Filed May 18, 1966   2 Sheets-Sheet 2

INVENTOR
Cloyse L. McCaleb

BY    Cecil L. Wood

ATTORNEY

United States Patent Office 3,455,296
Patented July 15, 1969

3,455,296
VIBRATOR ATTACHMENT FOR VEHICLE SEATS
Cloyse L. McCaleb, 5001 W. 10th St.,
Lubbock, Tex. 79416
Filed May 18, 1966, Ser. No. 551,083
Int. Cl. A61h 1/00
U.S. Cl. 128—33                                           1 Claim

ABSTRACT OF THE DISCLOSURE

An electric vibratorattachment for automobile cushions and springs comprising a motor with an eccentric driven thereby, and a plate on said motor for removably attaching the same to the underside of the springs to transmit a vibratory movement thereto and to said cushion.

---

This invention relates to vibrating means for attachment to vehicle seats, and it has particular reference to a vibrator attachment for one or more of the seats of a vehicle, including a passenger seat, whereby a vibrating motion may be applied thereto.

While in one form thereof the invention is particularly suitable for use in automotive vehicles, such as automobiles and trucks, the invention is applicable also to vehicles generally, including those operating on land and sea, and in the air, and offers a valuable aid to the operators of such vehicles.

The operators of most commercial vehicles, such as truck and bus drivers, locomotive engineers, and the pilots of aircraft and marine vessels, must be alert, and as a safety precaution they are usually careful to obtain sufficient rest before undertaking a tour of duty. Nevertheless many unfortunate accidents are believed to be caused by fatigue, and by the operators of vehicles involuntarily becoming drowsy and perhaps losing consciousness momentarily.

A prime object of the invention is that of providing vibrating means for attachment to a vehicle seat whereby a vibrating motion may be applied to the seat at intervals, as desired, while the vehicle is in use, to assist in keeping the occupant of the seat awake, to relieve nervous tension, as in traffic, and to produce a generally stimulating and invigorating effect, to combat fatigue, and to insure that the occupant is relaxed and alert, and enjoys a sense of well being at all times.

A further object of the invention resides in the provision of vibrating means which in one form thereof is particularly suitable for attachment to the seats of automotive vehicles, such as automobiles and trucks, and which is readily adapted for use in existing vehicles without substantial alteration thereof.

Broadly, the invention contemplates the provision of vibrating means far attachment to vehicle seats which is characterized by its simplicity and may be produced inexpensively, and which may be removably connected to the bottom of a cushion of an automobile seat, on the under side thereof, where it is fully concealed from view, and operative through a switch located on the instrument panel.

While the foregoing objects are paramount, other and lesser objects will become apparent as the description proceeds, when considered in connection with the appended drawings wherein.

Figure 1:
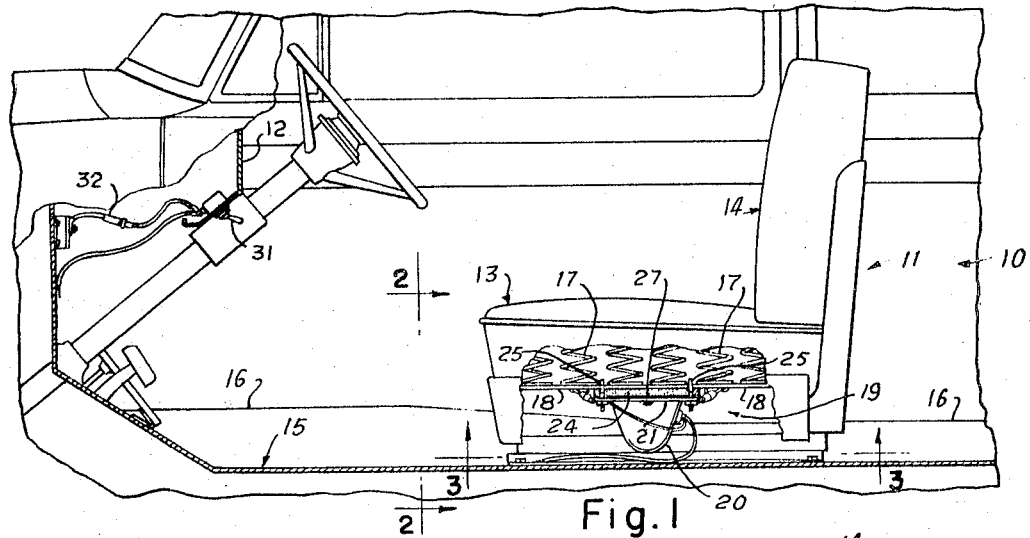
FIGURE 1 is a fragmentary side elevational view, partly broken away to show details of construction, of an automobile having vibrating means embodying the invention attached to the bottom cushion of the front seat, on the under side thereof, and operated by a switch located on the instrument panel.
Figure 2:
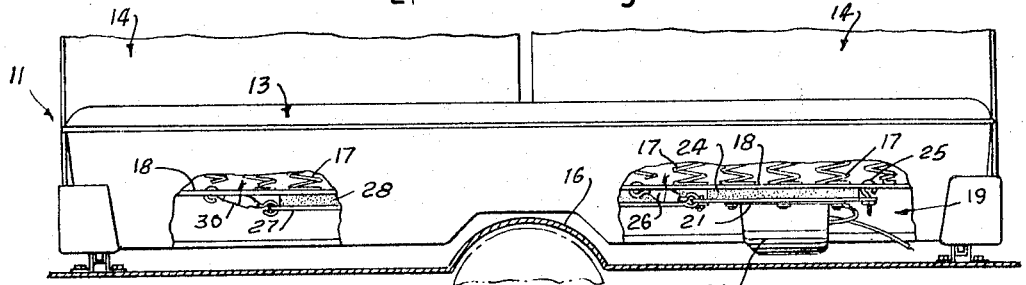
FIGURE 2 is a sectional elevational view, partly broken away, taken on the line 2—2 of FIGURE 1.
Figure 3:
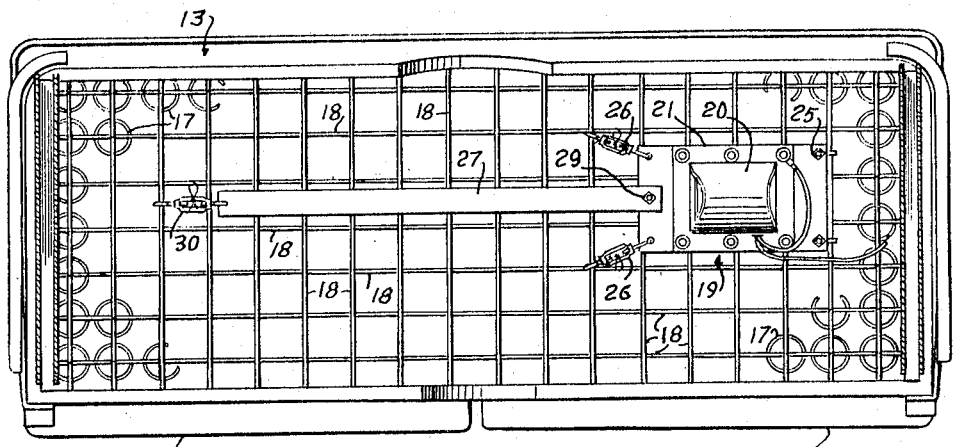
FIGURE 3 is a sectional plan view taken on the line 3—3 of FIGURE 1.

Referring to FIGURES 1 to 3 of the drawing, the numeral 10 designates generally an automobile having a front seat 11 and an instrument panel 12. The seat 11 is of the bench type, substantially coextensive with the width of the automobile 10, and has a bottom cushion 13 and a divided back 14.

As shown in FIGURES 1 and 2 the bottom of cushion 13 of the seat 11 is supported above the floor of the automobile 10, indicated by the numeral 15, in spaced apart relation thereto, in the usual manner, and there is more room between the floor 15 and the under side of the cushion 13 on opposite sides of the automobile 10 than in the middle thereof because of the presence of a longitudinally extending hump 16 in the floor 15 to accommodate a transmission and drive shaft assembly (not shown) below it.

As shown best in FIGURE 3, the bottom of the cushion 13 of the seat 11 is formed in part by an arrangement of inner springs including rows of coil springs 17 which are connected at their opposite ends by crossed tie wires 18. The tie wires 18, in accordance with the usual practice, may be connected at their ends, respectively, to a pair of boundary rods (not shown) each substantially coextensive with the peripheral edges of the cushion 13.

Figure 4:
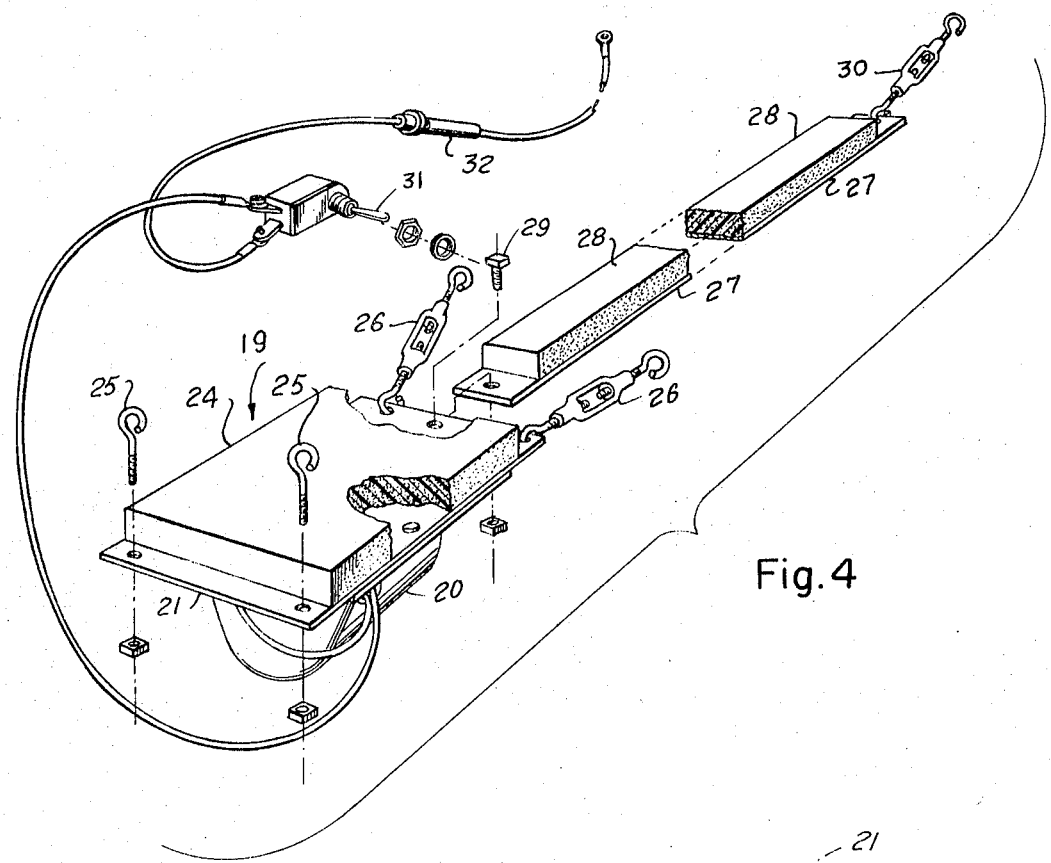
FIGURE 4 is an exploded perspective view on an enlarged scale, partly broken away, of the vibrating means.
Figure 5:
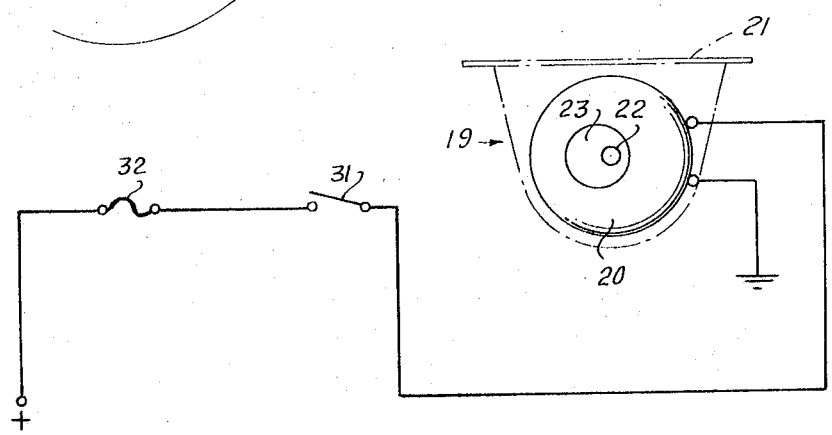
FIGURE 5 is an electrical diagram.

A vibrating unit as hereinafter described, indicated generally by the numeral 19, is removably connected to the under side of the cushion 13, on the side of the seat 11 which corresponds to the position of the operator. As shown in FIGURES 4 and 5, the vibrating unit 19 consists of an electric motor 20 having a base plate 21 and having a shaft 22 which is unbalanced by attachment of an eccentric weight 23 thereto. The base plate 21 has a pad 24 formed of resilient material, such as foam rubber, on the side thereof opposite the motor 20.

The vibrating unit 19 is attached to the tie wires 18 on the under side of the cushion 13 with the pad 24 uppermost, between the tie wires 18 and the base plate 21, and with the motor 20 depending therefrom, by a pair of fastening devices 25 whereby the base plate 21 is secured at one end to one of the tie wires 18 extending transversly of the cushion 13 near one of its ends, longitudinally of the automobile 10, and by a pair of turnbuckles 26 whereby the base plate 21 is adjustably secured at its opposite end to another of the tie wires 18. The pad 24 is clamped between the base plate and the opposing tie rods 18.

The vibrating unit 19 cannot be positioned in the middle of the seat 11 because of the presence of the hump 16 in the floor 15. An elongated metal strip 27, which has a pad 28 corresponding to the pad 24 on one side thereof, extends longitudinally of the cushion 13, with the pad 28 uppermost, and forms an extension of the base plate 21. The strip 27 is connected at one of its ends by a fastening device 29 to the end of the base plate 21 opposite said one end, and is adjustably connected at its opposite end, by a turnbuckle 30, to another of the tie rods 18 near the opposite end of the cushion 13. The pad 28 is clamped between the strip 27 and the opposing tie rods 18.

In a modified form of the invention, in which the vibrating unit 19 may be positioned in the middle of the seat 11, as in the case of an individual seat for the accommodation of a single occupant, the extension of the base plate 21 comprising the strip 27 and the pad 28 is not required.

As shown in FIGURES 1 and 5, the vibrating unit 19 is operable by a switch 31 on the instrument panel 12. The electrical circuit, shown in FIGURE 5, includes also a fuse 32. The lead wires whereby the vibrating unit 19 is operatively connected to the switch 31 advantageously may extend along the floor 15 and may be partly covered by a mat or carpet (not shown).

The invention may be modified within certain limitations, by persons skilled in the art, without departing from the spirit and intent thereof or the scope of the appended claim.

What is claimed is:

1. A vibrator for automotive vehicle seats having a frame, a series of laterally spaced wires arranged longitudinally and transversely of said frame forming a grid, a plurality of uniformly spaced coil springs on said grid, and a cushion on said springs, in combination, an electric vibrator having a base plate and a resilient pad on said plate, hook means on each end of said plate for securing the latter to said grid below said springs whereby said pad is applied to said grid, an elongated metal strip removably connected at one end to an end of said plate and forming an extension thereof longitudinally of said grid, and having its opposite end detachably secured to said grid, and a resilient pad arranged longitudinally of said strip for engaging said grid in a common plane with the pad on said base, and means for connecting said vibrator into the electrical system of a vehicle.

References Cited

UNITED STATES PATENTS

| | | |
|---|---|---|
| 2,717,593 | 9/1955 | Murphy _____ 128—33 |
| 2,843,113 | 7/1958 | Miller _____ 128—33 |
| 2,920,619 | 1/1960 | McMillan et al. _____ 128—33 |
| 3,194,522 | 7/1965 | Azneer _____ 128—33 XR |

L. W. TRAPP, Primary Examiner